US009739292B1

(12) United States Patent
Peterson et al.

(10) Patent No.: US 9,739,292 B1
(45) Date of Patent: Aug. 22, 2017

(54) HYDRAULIC ACCUMULATOR HAVING A CLOSING ARRANGEMENT

(71) Applicant: Kocsis Technologies, Inc., Alsip, IL (US)

(72) Inventors: Todd Daniel Peterson, Joliet, IL (US); Louis Kocsis, Jr., Orland Park, IL (US); Brandon Michael Richards, Mount Prospect, IL (US); Jeffery David Aguilera, Dyer, IN (US); Jason Richard Kujak, Forest Park, IL (US); Sandra Lynn Kocsis-Rogalski, Frankfort, IL (US)

(73) Assignee: Kocsis Technologies, Inc., Alsip, IL (US)

( * ) Notice: Subject to any disclaimer, the term of this patent is extended or adjusted under 35 U.S.C. 154(b) by 0 days.

(21) Appl. No.: 14/664,170

(22) Filed: Mar. 20, 2015

Related U.S. Application Data

(60) Provisional application No. 61/968,620, filed on Mar. 21, 2014.

(51) Int. Cl.
*F16L 55/04* (2006.01)
*F15B 1/24* (2006.01)

(52) U.S. Cl.
CPC .................................... *F15B 1/24* (2013.01)

(58) Field of Classification Search
USPC .................................................... 138/30, 31
See application file for complete search history.

(56) References Cited

U.S. PATENT DOCUMENTS

| | | | | | |
|---|---|---|---|---|---|
| 1,671,526 | A * | 5/1928 | Gilmer | F16J 9/10 277/446 |
| 2,417,873 | A * | 3/1947 | Huber | F15B 1/24 138/31 |
| 2,683,467 | A | 7/1954 | Greer | |
| 2,870,791 | A | 1/1959 | Strickler | |
| 2,937,663 | A * | 5/1960 | Ashton | F15B 1/24 138/31 |
| 3,015,345 | A | 1/1962 | Michael | |
| 3,047,023 | A * | 7/1962 | Dick | F15B 1/24 138/31 |
| 3,148,705 | A * | 9/1964 | Mercier | F15B 1/04 138/30 |
| 3,454,050 | A * | 7/1969 | Wolf | F15B 1/24 138/31 |
| 3,537,357 | A | 11/1970 | Packer | |
| 3,537,481 | A * | 11/1970 | Mercier | B29C 33/0033 138/30 |

(Continued)

*Primary Examiner* — James Hook
(74) *Attorney, Agent, or Firm* — Erickson Law Group, PC

(57) ABSTRACT

A hydraulic accumulator having a closing arrangement. The accumulator has a housing, a removable end cap, a segmented locking ring, and a pilot ring. The housing has at least one opening, an interior space, and a ring recess adjacent the opening. The removable end cap is sized to close the opening when in a closed position. The segmented locking ring is removably positioned within the ring recess adjacent the end cap opposite the interior space to stop the end cap from moving in a first direction away from the interior space. The locking ring may be segmented. The pilot ring is removably connected to the end cap and positioned to hold the locking ring in the ring recess when connected to the end cap.

20 Claims, 9 Drawing Sheets

(56) References Cited

U.S. PATENT DOCUMENTS

| | | | | | |
|---|---|---|---|---|---|
| 3,893,485 | A | * | 7/1975 | Loukonen | F16L 55/053 138/30 |
| 4,068,684 | A | * | 1/1978 | Greer | F15B 1/18 138/30 |
| 4,347,871 | A | * | 9/1982 | Zahid | F15B 1/22 138/30 |
| 4,413,652 | A | | 11/1983 | Allewitz | |
| 4,432,393 | A | | 2/1984 | Mills | |
| 4,450,870 | A | | 5/1984 | Vick | |
| 4,461,322 | A | * | 7/1984 | Mills | F15B 1/24 138/31 |
| 4,577,663 | A | | 3/1986 | Andersen et al. | |
| 4,777,800 | A | | 10/1988 | Hay, II | |
| 4,966,200 | A | | 10/1990 | Bents | |
| 5,353,840 | A | | 10/1994 | Paley | |
| 5,505,228 | A | | 4/1996 | Summerfield | |
| 7,066,208 | B2 | | 6/2006 | Kort | |
| 7,918,245 | B2 | * | 4/2011 | Staudinger | F15B 1/04 137/565.34 |
| 8,267,123 | B2 | | 9/2012 | LeBlanc et al. | |
| 2004/0238054 | A1 | | 12/2004 | Weber | |

* cited by examiner

HYDRAULIC ACCUMULATOR HAVING A CLOSING ARRANGEMENT

This application claims the benefit of U.S. provisional patent application No. 61/968,620, filed on Mar. 21, 2014, which is herein incorporated by reference.

FIELD OF THE INVENTION

This invention relates in general to hydraulic accumulators.

BACKGROUND OF THE INVENTION

An accumulator is known to enable a hydraulic system to handle peak demand with a less powerful pump, increase response time to demands, and smooth pulsations. Accumulators are able to store energy for use in hydraulic systems.

U.S. Pat. No. 7,520,129 discloses an accumulator having interior space than is enclosed at the ends by end caps that are threaded to the accumulator housing. The present inventors recognized that the threaded securement of an end cap has disadvantages. One disadvantage arises when the accumulator is located in a harsh environment, such as on the sea floor, where the cap's connection to the accumulator housing can rust, corrode, or become encumbered by debris or organic matter from the environment so as to make it very difficult to unscrew and remove the cap from the accumulator housing for disassembly or maintenance.

The present inventors recognized the need for an accumulator that is better adapted for maintenance after operating in certain environmental conditions, such as when located on the sea floor or at significant depth below a water surface. The present inventor recognized that it would be desirable to provide an end cap securing mechanism that is easier to operate.

SUMMARY OF THE INVENTION

A hydraulic accumulator having a closing arrangement is disclosed. The accumulator comprises a housing, a removable end cap, a segmented locking ring, and a pilot ring. The housing has at least one opening, an interior space, and a ring recess adjacent the opening. The removable end cap is sized to close the opening when in a closed position. The segmented locking ring is removably positioned within the ring recess adjacent the end cap opposite the interior space to stop the end cap from moving in a first direction away from the interior space. The locking ring may be segmented. The pilot ring is removably connected to the end cap and positioned to hold the locking ring in the ring recess when connected to the end cap.

In some embodiments, the cap comprises a peripheral step wall. The housing comprises an internal stop wall adjacent the opening to engage the peripheral step wall and prevent the end cap from moving in a second direction toward the interior space.

In some embodiments, the end cap has a circumferential wall comprising a first portion, a second portion, and a step portion. The step portion extends transverse to the first and second portions. The step portion is positioned to contact the stop wall of the housing adjacent to the opening to stop the end cap from moving in a second direction toward the interior space.

In some embodiments, the first portion of the circumferential wall of the end cap is in contact with a first wall portion of the housing and the second portion of the circumferential wall is in contact with at least a portion of a second wall portion of the housing and the step wall is in contact with the stop wall when the end cap is in the closed position. The stop wall extends transverse to the first wall portion and the second wall portion. The ring recess is located along the second wall portion of the housing.

In some embodiments, the pilot ring comprises a peripheral lip. The peripheral lip at least partially blocks the locking ring from moving in the first direction away from the interior space of the housing.

In some embodiments, the segmented locking ring comprises a rectangle cross-section and the ring recess comprises at least a partial rectangle cross-section recess.

In some embodiments, the accumulator has a movable piston located in the interior space of the housing. The piston divides the interior space in to a first hydraulic fluid chamber and a second inert gas chamber.

In some embodiments, the end cap comprises a fill port providing fluid communication between an exterior of the end cap and at least a portion of the interior space.

A method of closing a hydraulic accumulator is disclosed. The end cap is slid into an opening of the accumulator until the end cap is prevented from further inward movement in a first direction by a stop element of the accumulator. Each of the segments of a plurality of segments of a segmented ring are placed in a ring recess of the accumulator adjacent a front surface of the end cap to prevent the end cap from moving outward in a second direction. A pilot ring is releasably attached to a front surface of the end cap to hold the segmented ring in the ring recess.

Numerous other advantages and features of the present invention will become readily apparent from the following detailed description of the invention and the embodiments thereof, from the claims, and from the accompanying drawings.

DETAILED DESCRIPTION

Figure 1:
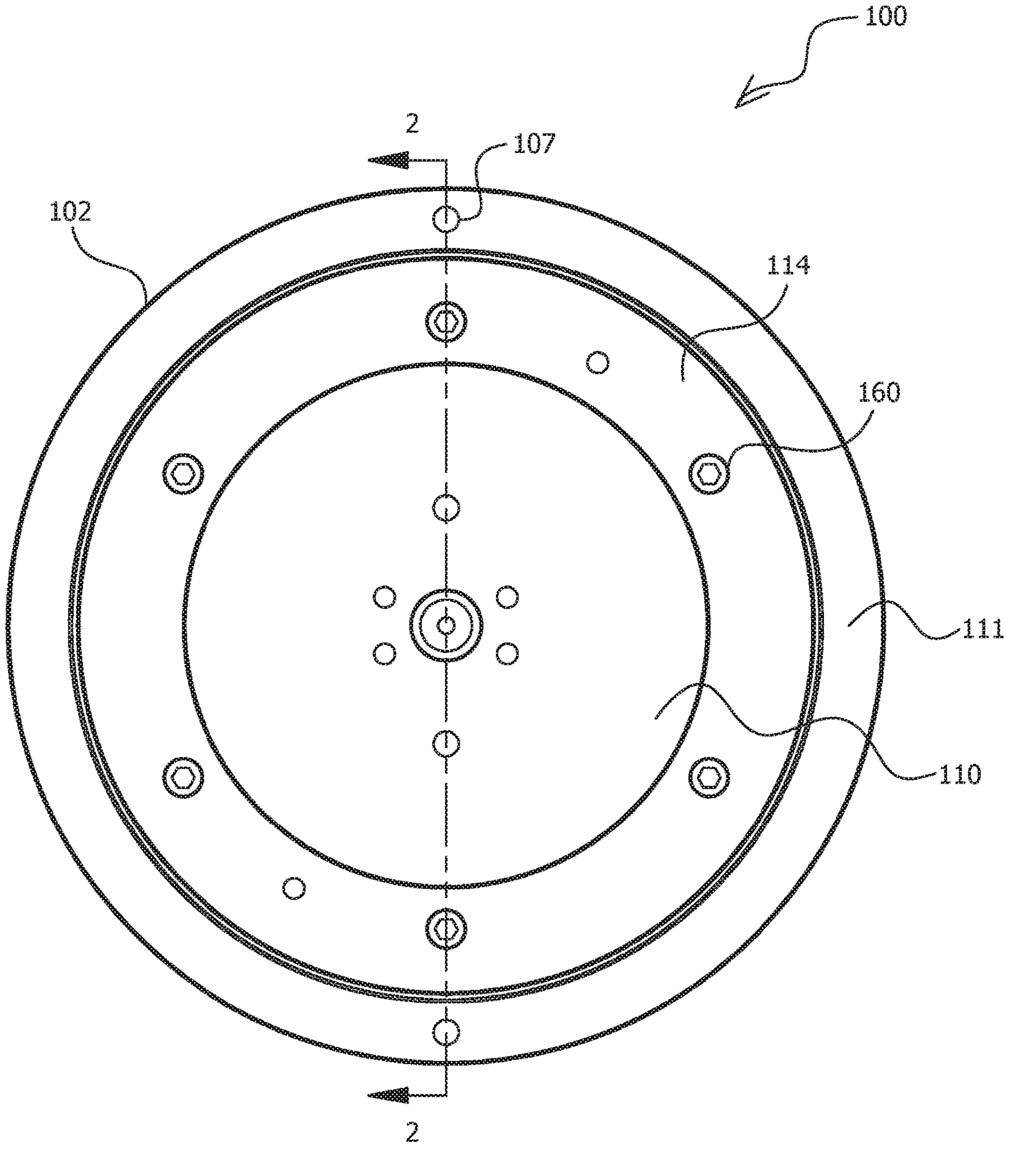
FIG. 1 is an end view of a hydraulic accumulator having a closing arrangement.

A hydraulic accumulator and an end closing arrangement for a hydraulic accumulator are disclosed. The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
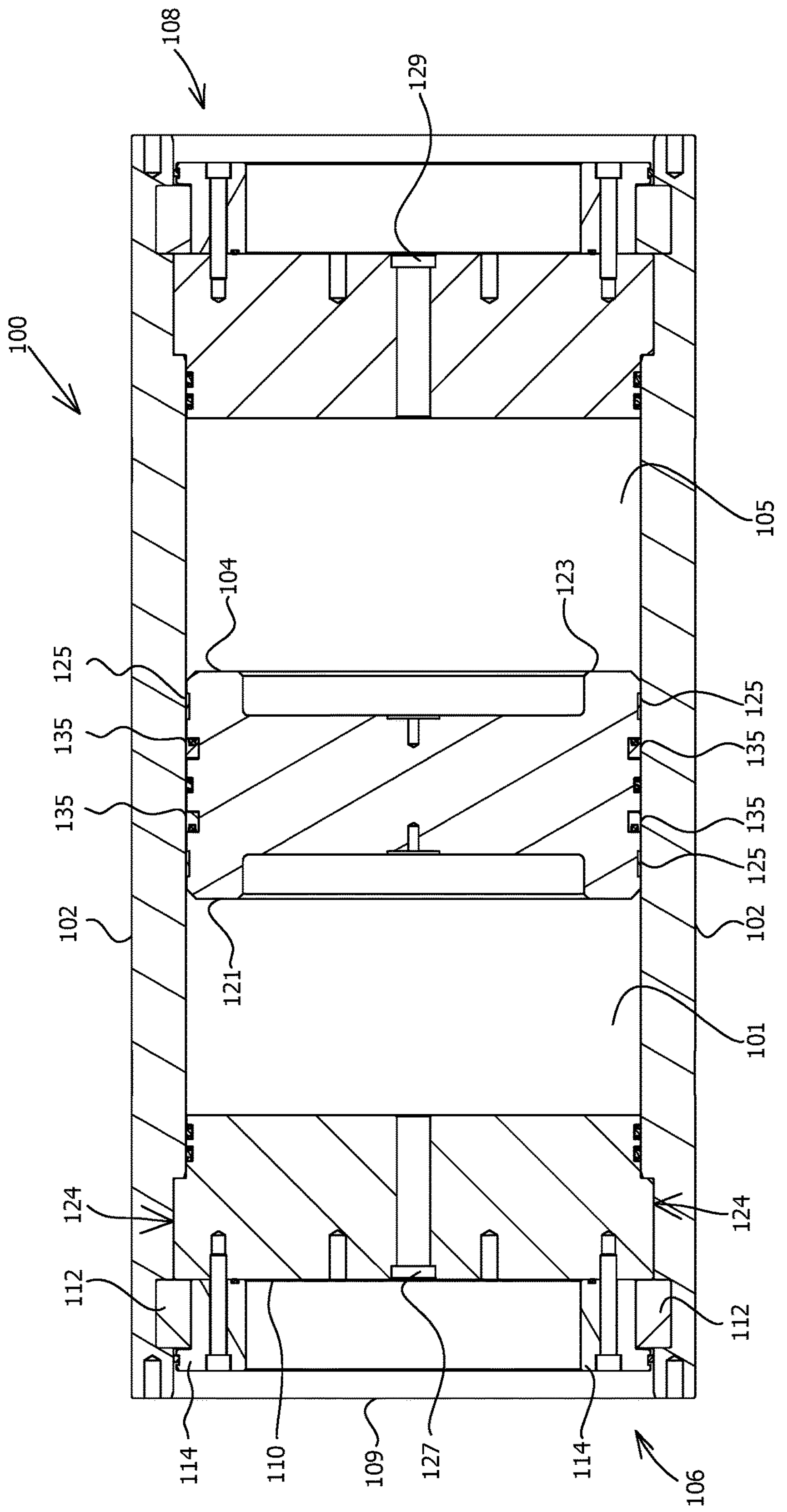
FIG. 2 is a side section view of the hydraulic accumulator taken along line 2-2 of FIG. 1.
Figure 3:
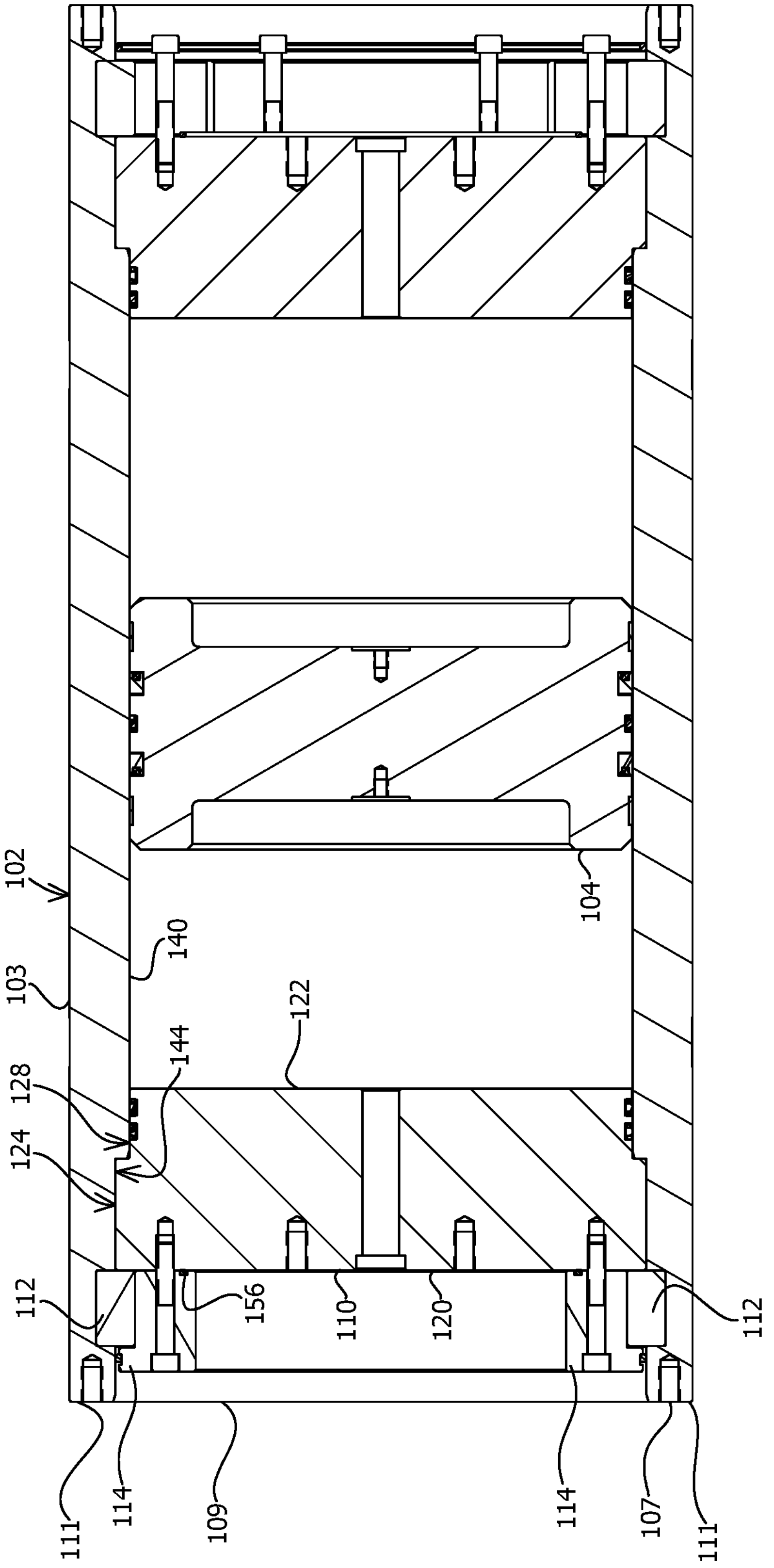
FIG. 3 is an enlarged side section view of a portion of the hydraulic accumulator from FIG. 2.

FIGS. 1-3 show an accumulator 100 having an embodiment of closing arrangements 106, 108. The accumulator 100 comprises a housing 102 surrounding an interior space 101, 105, a piston 104 within the space 105, and two end closing arrangements 106, 108.

The end closing arrangements 106, 108 are identical, and therefore only closing arrangement 106 will be described in detail. The closing arrangement 106 comprises an end cap 110, a segmented ring 112, and a pilot ring 114. The pilot ring 114 is recessed from the end face housing wall 111. The end face housing wall has upper and lower cover fastener openings 107.

The piston 104 divides the interior space 101, 105 into a first chamber 101 and a second chamber 105. The first chamber 101 may be fluidly coupled to a hydraulic system, such as through fluid port 127, to receive pressurized hydraulic fluid. The second chamber 105 can be filled with an inert gas such as a nitrogen gas. The inert gas can be filled through gas port 129. One or more seals 135 and piston rings 125 surround the piston to prevent hydraulic fluid and/or the inert gas from leaking across the piston between the first and second chambers. Port 129 may be closed and sealed by means known in the art, such as a closing element, cap, or nut, when not being filled with gas or connected to a gas source. Likewise port 127 can be closed and sealed by means known in the art when not connected to a hydraulic system or otherwise when closing of the port is desired.

During operation, pressurized hydraulic fluid is stored in the first chamber 101 via a pump (not shown) in fluid-communication with port 127. The hydraulic fluid acts on a first side 121 of the piston 104 in the first chamber, causing the piston to move toward the second chamber 105 to a loaded position. As the piston moves toward the loaded position, the volume of the second chamber 105 is reduced and the gas in the second chamber is compressed between the piston and the end cap. Therefore, the pressure of the gas in the second chamber increases until a force exerted on the first side 121 of the piston by the pressure of the hydraulic fluid in the first chamber is substantially equal to a force exerted on a second side 123 of the piston 104 by the pressure of the compressed gas in the second chamber. During operation, accumulators can remain in the loaded position for a relatively long period of time. Therefore, the hydraulic fluid in the first chamber 101 and gas in the second chamber can be subjected to high levels of pressure for a relatively long period of time. The end closing arrangements 106, 108 close and seal the ends of the accumulator and prevent leaks from the pressure of the fluid or gas.

When the demand in a hydraulic system having an accumulator increases, the pressure of the hydraulic fluid in the first chamber 101 decreases. When the pressure of the hydraulic fluid in the first chamber 101 decreases below the pressure provided by the compressed gas in the second chamber 105, the gas expands and drives the piston toward the first chamber 101 exerting a force on the hydraulic fluid via the piston. As a result, the accumulator apparatus supplies the hydraulic system with previously stored pressurized hydraulic fluid. The pre-load pressure of the gas in the second chamber determines the minimum system pressure provided by the accumulator. It will be recognized that chambers 101, 105 can be swapped so that chamber 101 contains the gas and chamber 105 contains the hydraulic fluid. The end closing arrangement 106, 108 can be used with other non-piston hydraulic accumulators, such as elastic diaphragm hydraulic accumulators, enclosed bladder hydraulic accumulators, and spring-type accumulators. Some hydraulic accumulators have only one opening and therefore may only utilize one end closing arrangement.

The housing 102 comprises an outside wall 103. In some embodiments the outside wall 103 is cylindrical. The housing 102 comprises a first interior wall 140 and a second interior wall portion 144 with a housing step wall 142 between the first interior wall 140 and the second interior wall portions 144, 152. The second interior wall portion comprises an inner portion 144 and an outer portion 152. The second interior wall portion is located closer to an end 109 of the accumulator 100 as compared to the first interior wall 140. The housing step wall extends about the entire inner circumference of the housing. In some embodiments, the housing step wall is perpendicular to the first interior wall 140 and the inner second interior wall portion 144.

The end cap 110 comprises an outer/front face 120 and an opposite inter face 122. The inter face faces the interior and the piston 104. Between the inner and outer face of the end cap is a first peripheral surface 128 and a second peripheral surface 124 with an end cap step wall 126 there between. The first peripheral surface 128 comprises to gasket recesses 131 and 133, each comprising a gasket or O-ring 130, 132 respectively. In some embodiments, the first and second peripheral surfaces 128, 124 do not comprise threads for securing the end cap to the housing. In some embodiments, the first and second peripheral surfaces 128, 124 are flat. In some embodiments, the first and second peripheral surfaces 128, 124 are substantially smooth. The end cap step wall extends about the entire circumference of the end cap. In some embodiments, the housing step wall is perpendicular to a first peripheral surface 128 and a second peripheral surface 124.

Figure 4:
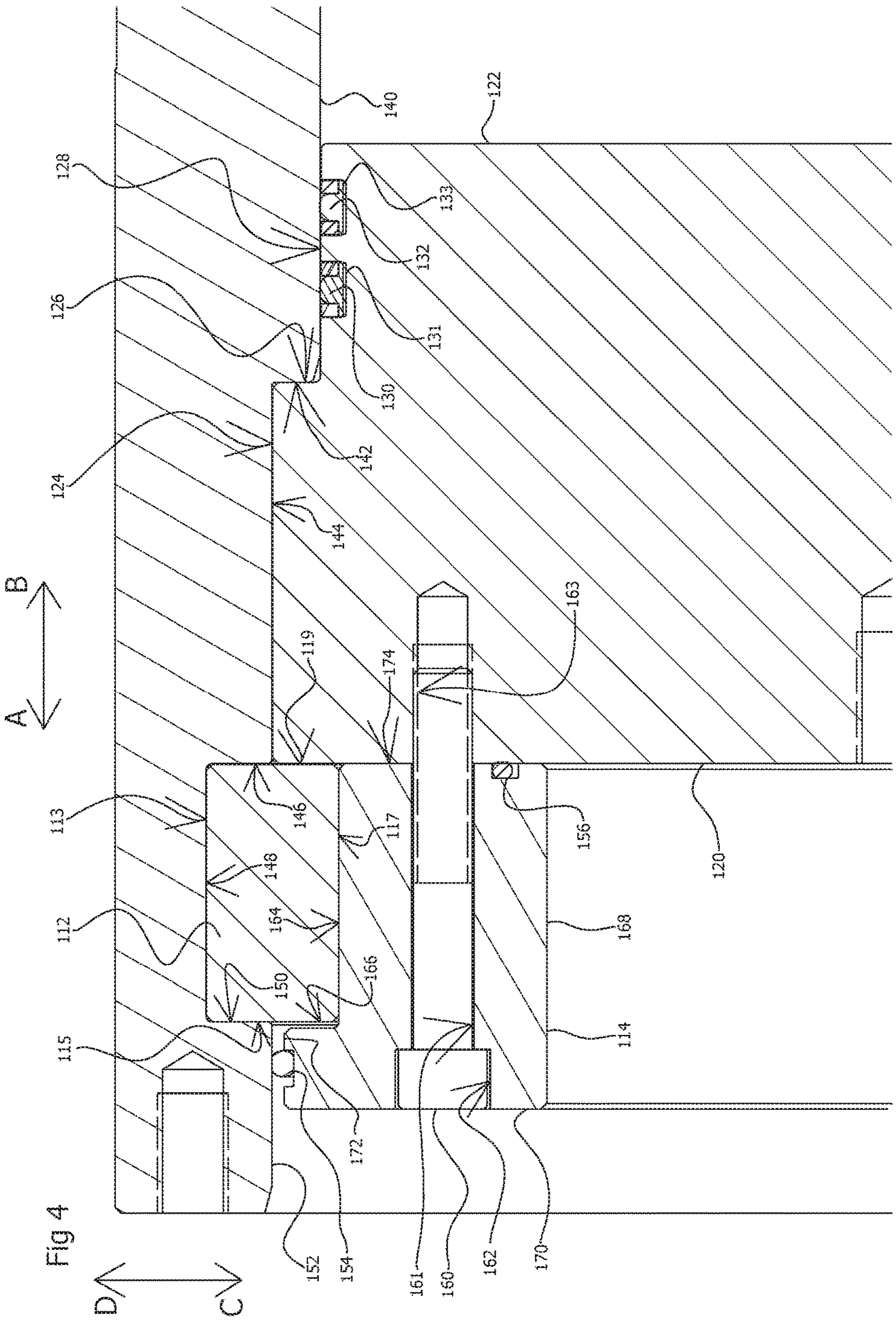
FIG. 4 is an enlarged side section view of a portion of the hydraulic accumulator from FIG. 2.
Figure 5:
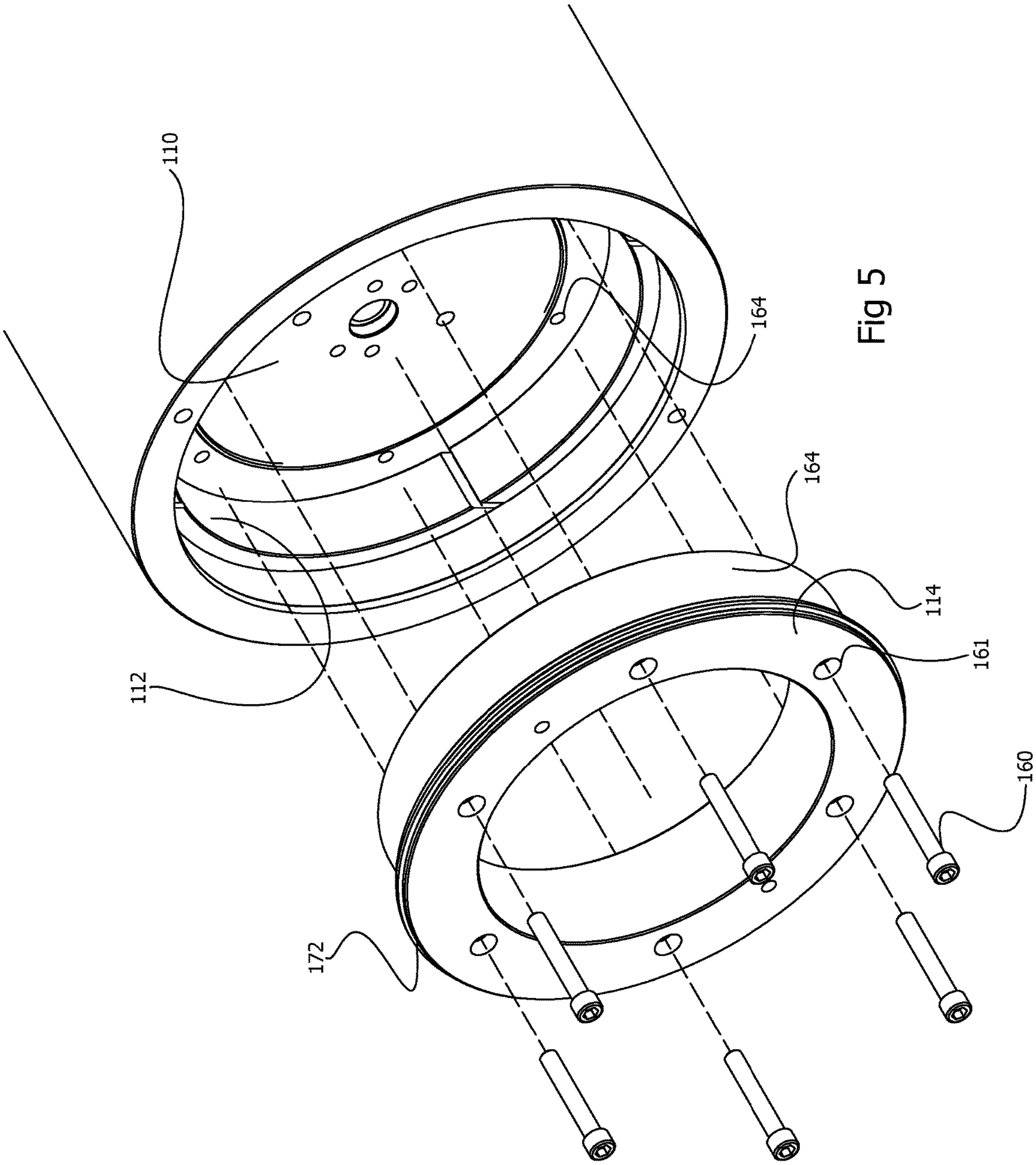
FIG. 5 is a partially exploded perspective view of the hydraulic accumulator of FIG. 2.
Figure 6:
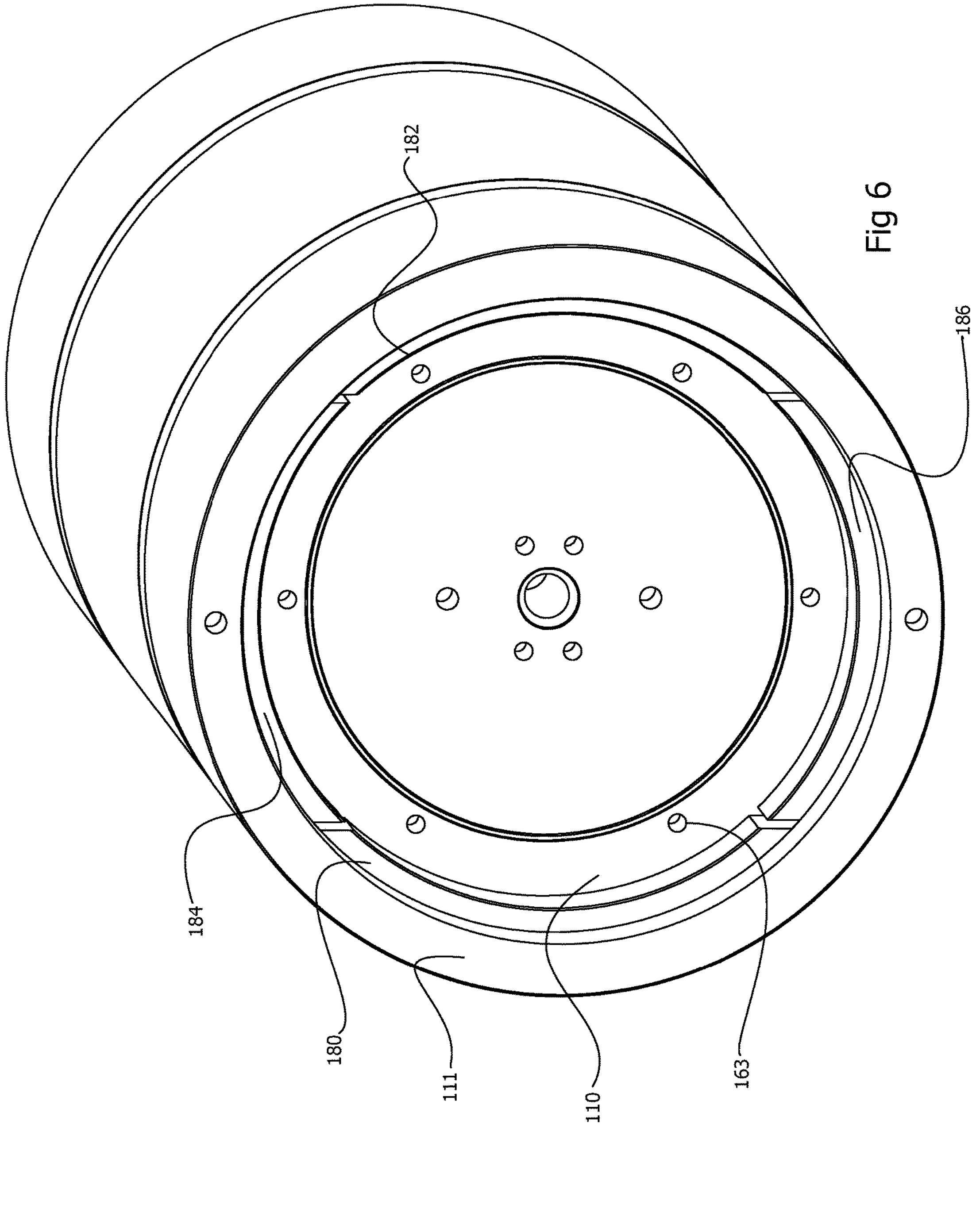
FIG. 6 is a perspective view of the hydraulic accumulator of FIG. 2 with a pilot ring removed.

When the segmented ring 112, and the pilot ring 114 are removed or not otherwise present, the end cap can be moved in the direction A or B as shown in FIG. 4. The end cap can be removed from the housing by pulling the end cap in the direction A. However, the housing step wall 142 limits the extent to which the end cap be moved in the direction B. Further movement in the direction B is prohibited by contact between the end cap step wall 126 and the housing step wall 142. When then the end cap step wall is suit against the housing step wall, the second peripheral surface 124 is in surface-to-surface contact with the second interior wall portion 144 of the housing and the first peripheral surface 128 is in surface-to-surface contact with a portion of the first interior wall 140, except for the gasket recesses 131, 133, as shown in FIG. 4.

To prevent the end cap 110 from moving in that direction A, out of the housing, a stop ring, such as the segmented ring 112, is placed in a ring recess 145 in the second interior wall portion 144, 152 between the inner portion 144 and the outer portion 152. The ring recess has a first wall 146, a second wall 148, and a third wall 150. In some embodiments, the walls 146,148, 150 of the ring recess 145 form a partial rectangle, as shown in FIG. 4, with two 90-degree angle corners. In some embodiments, the ring recess 145 is shaped to receive square, quadrilateral, round, oval, triangle or other cross-section shaped segmented rings.

The segmented ring 112 is configured to fit in the ring recess 145 to prevent the end cap from moving in the direction as shown in FIG. 4 and being removed or dislodged from the housing step wall 142. The segmented ring 112 has an outer surface 113, an inner surface 117, a rear surface 119, and a front surface 115. The outer surface 113 of the segmented ring is configured to mate in surface to surface contact with the second wall 148 of the ring recess 145. The rear surface 119 of the segmented ring is prohibited from moving in the direction B by contact with the first wall 146 of the ring recess 145. The front surface 115 is prohibited from moving in the direction A by contact with the third wall 150 of the ring recess 145. The end cap 110 is prohibited from moving in the direction A when the segmented ring 112 is in the ring recess 145 so that the front surface 120 of the end cap 110 is prevented from moving in the direction A by contact with a portion of the rear surface 119 of the segmented ring. Outward pressure and force from the end cap in the direction A is transferred by the segmented ring to the housing at the ring recess.

To secure the segmented ring 112 in the ring recess 145 a pilot ring 114 is installed. The pilot ring 114 comprises a front surface 170, a rear surface 174, a first outer surface 172, a pilot ring step wall 166, a second outer surface 164, and an inner surface 168. The rear surface 174 is configured to be placed against the front surface 120 of the end cap. The pilot ring is held against the end cap by pilot ring fasteners 160, such as bolts. The fasteners 160 extend through pilot ring fastener openings 161. The pilot ring fastener openings have a countersink 162 to receive the head of the fastener 160. The pilot ring fastener openings 161 are aligned with fastener end cap openings 163. The fastener end cap openings may be threaded to receive a threaded shaft (not shown) of the fastener 160.

When the pilot ring is secured to the end cap with the fasteners 160, the segmented ring is prohibited from moving in the direction C of FIG. 4 by the second outer surface 164, and is prohibited from moving in the direction A by the pilot ring step wall 166 and third wall 150 of the ring recess, and is prohibited from moving in the direction B by the front surface 120 of the end cap and the first wall 146 of the ring recess, and is prohibited from moving in the direction D by the second wall 148 of the ring recess. In some embodiments, there are tolerances that allow the segmented ring to move slightly within the boundaries just described. The first outer surface 172 has a larger circumference than the second outer surface. The pilot ring step wall 166 connects the first outer surface 172 to the second outer surface 164. In some embodiments, the pilot ring step wall 166 is perpendicular to the first outer surface 172 and the second outer surface 164. The first outer surface 172 has a rectangular gasket recess for receiving a pilot ring circumferential gasket 154 or o-ring. The rear surface 174 also has a rectangular gasket recess for receiving a pilot ring rear gasket 156.

Figure 7:
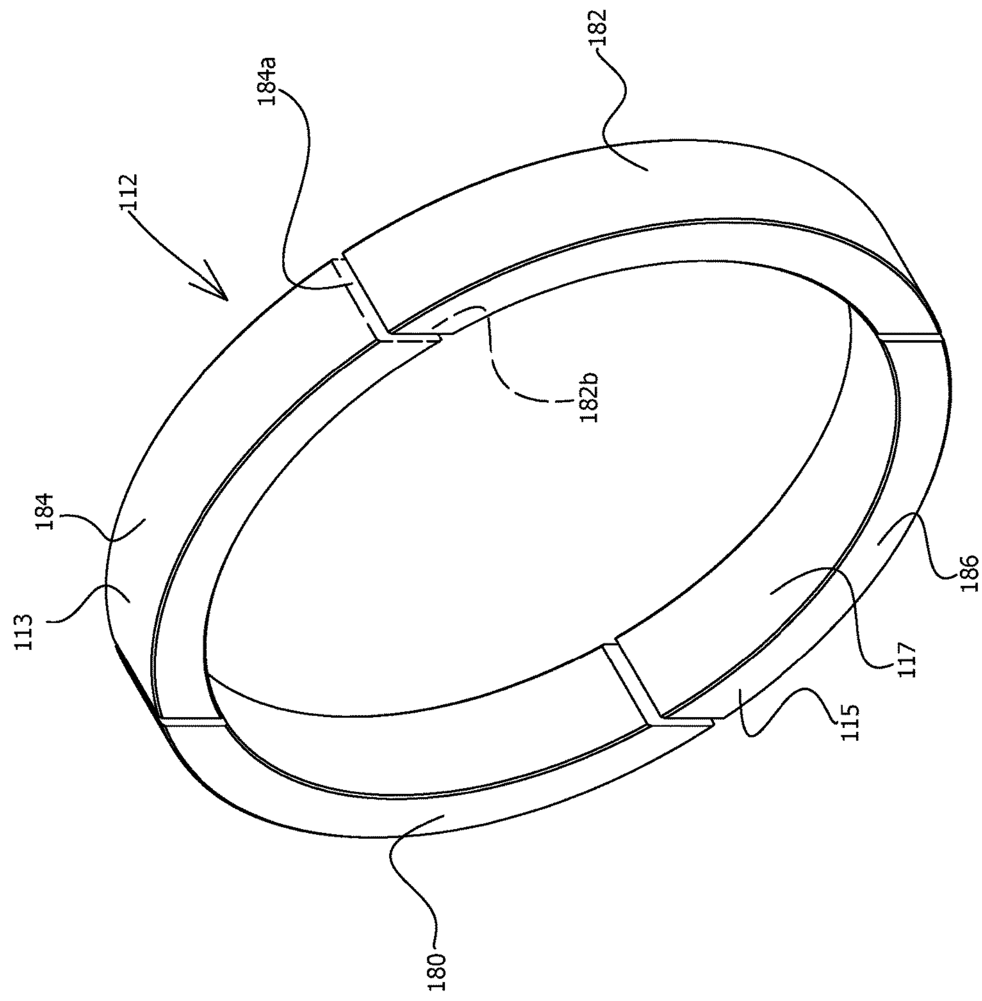
FIG. 7 is a segmented ring of the closing arrangement of FIG. 2.

The segmented ring 112 has a plurality of segments. In one embodiment, the segmented ring 112 has four segments 180, 182, 184, 186 as shown in FIGS. 5-9. The segmented ring may be made by taking a ring and making two longitudinal cuts offset in opposite direction from a central vertical diameter line of the ring. In some embodiments, the segments can be equal in arc length. In some embodiments, the opposite segments 180 and 182 are equal in arc length and opposite segments 184 and 186 are equal in arc length, but segments 180 and 184 are not equal in arc length. A first end 184*a* of one segment, such as segment 184 is configured to mate with a second end 182*b* of the next segment, such as segment 182 as shown in FIG. 7.

Figure 8:
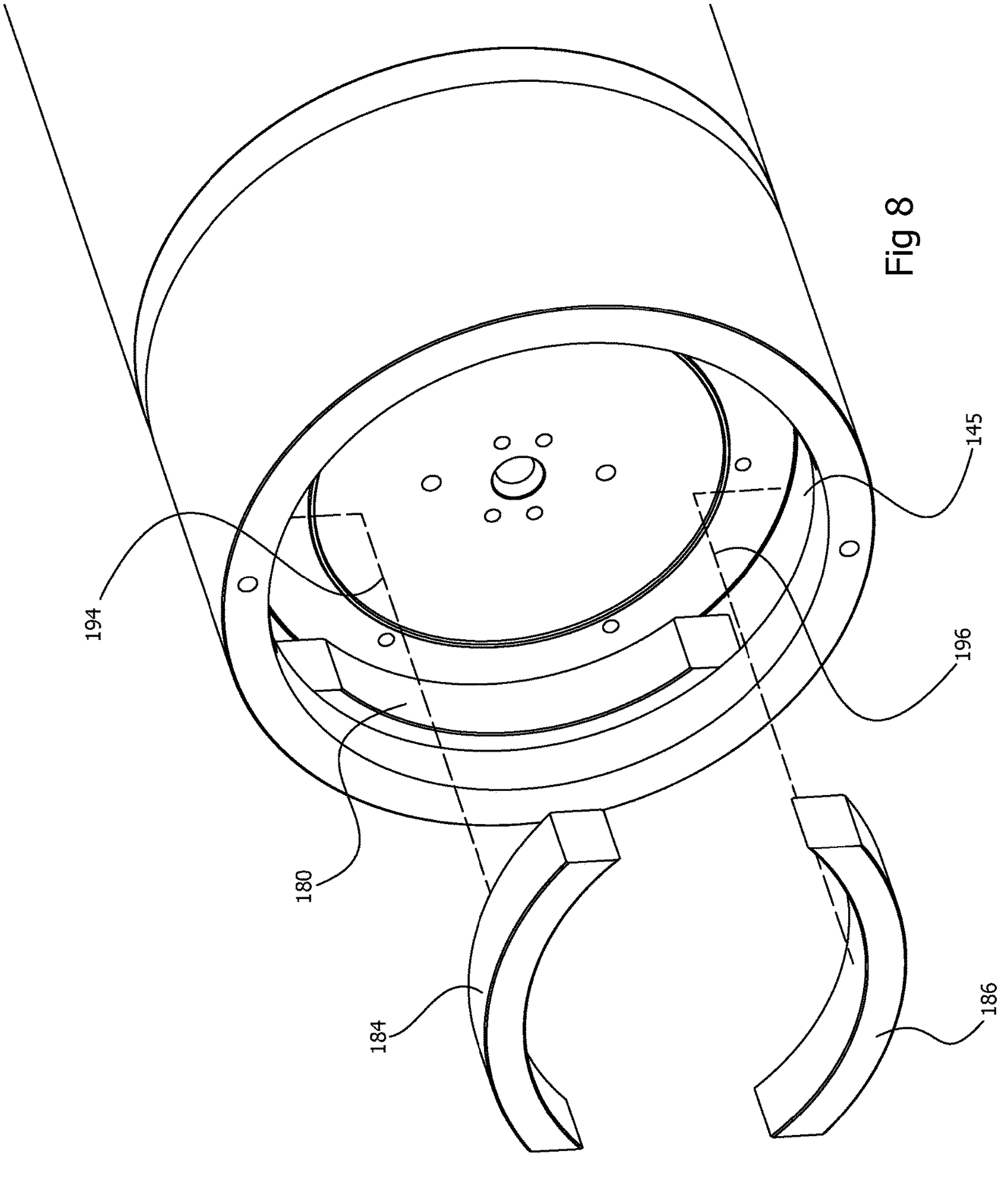
FIG. 8 is a perspective view of the hydraulic accumulator of FIG. 2 with the segmented ring partially installed.
Figure 9:
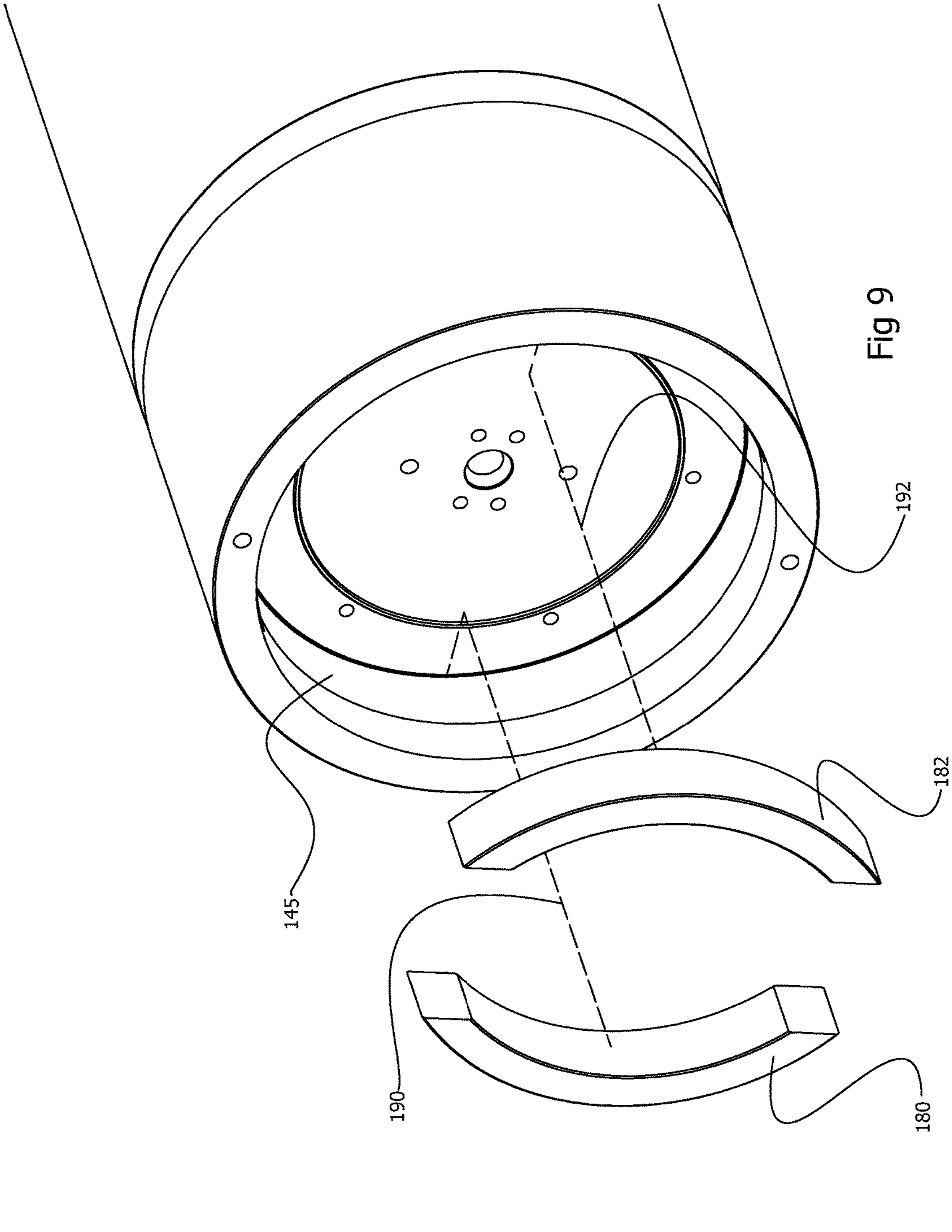
FIG. 9 is a perspective view of the hydraulic accumulator of FIG. 2 with a portion of the segmented ring ready to be installed.

FIGS. 8 and 9 demonstrate one method of installing the segmented ring. In FIG. 9 the segments 180, 182 are installed. Segment 180 is installed a long install path 190. Install pass 190 provides that segment 180 is moved first towards the face of the end cap then is slid leftward toward the interior wall of the housing into the ring recess 145. Likewise segment 182 is moved a long install path 192 and a similar, mirror image fashion to that of install path 190. The next steps as shown in FIG. 8 where the remaining segments 184, 186 are installed along install paths 194, 196. Segment 184 is first moved towards the face of the end cap then is slid upward toward the interior wall of the housing into the ring recess 145. Segment 186 is first moved towards the face of the end cap then is slid downward toward the interior wall of the housing into the ring recess 145.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A hydraulic accumulator, comprising:

a housing comprising an interior wall and an interior space, the interior wall comprising a first wall portion, a second wall portion, a ring recess, and a stop wall between the first wall portion and the second wall portion, the stop wall extending transverse to the first wall portion and the second wall portion, the ring recess located along the second wall portion;

a removable end cap configured to close at least one end of the interior space, the stop wall of the housing positioned to stop the end cap from moving in a first direction;

a segmented ring removably receivable in the ring recess to prevent the end cap from moving in a second direction out of the housing opposite of the first direction; and, a pilot ring removably connected to the end cap and positioned to hold the segmented ring in the ring recess when connected to the end cap, the pilot ring comprises a first ring portion, a lip, and an open interior, the open interior configured to permit access to the end cap, the lip extends radially from the first ring portion opposite of the open interior, the lip covers an exterior face of the segmented ring opposite the end cap to create a seal between the pilot ring and the second wall portion of the housing when the pilot ring is connected to the end cap.

2. The accumulator of claim 1, wherein the end cap comprises a circumferential wall comprising a first portion, a second portion, and a step portion, the step portion extending transverse to the first portion and the second portion, the step portion positioned to contact the stop wall to stop the end cap from moving in the first direction.

3. The accumulator of claim 2, wherein the end cap comprises a closed position relative to the housing, when in the closed position, the first portion of the circumferential wall is in contact with the first wall portion of the housing and the second portion of the circumferential wall is in contact with at least a portion of the second wall portion of the housing and the step wall is in contact with the stop wall.

4. The accumulator of claim 3, wherein the first ring portion of the pilot ring comprises an outside annular surface that engages and covers an interior annular surface of the segmented ring, the lip extends radially beyond the outside annular surface;

the first ring portion and the lip of the pilot ring form an L-shape cross-section;

a rear surface of the first ring portion provides a sealed engagement with the end cap when the pilot ring is connected to the end cap;

an outside annular surface of the lip comprises a seal recess configured to receive a seal element; and, the rear surface of the first ring portion comprises a seal recess configured to receive a seal element.

5. The accumulator of claim 4, wherein the segmented ring comprises an exterior annular surface, the interior annular surface, the exterior face, and a back face, the exterior annular surface is opposite of the interior annular surface, the exterior face is an exterior front face, the front face is opposite of the back face, the front face and back face are each transverse to the interior annular surface and the exterior annular surface;

the front face and the back face are each partially received within the ring recess;

an exposed portion of the front face is covered by the lip; and, a portion of the back face that is not received within the ring recess is covered by the end cap.

6. The accumulator of claim 1, wherein the pilot ring is removably attached to an outer face of the end cap.

7. The accumulator of claim 1, wherein the pilot ring comprises a plurality of spaced apart fastener openings, and where the pilot ring is fastened to the end cap with fasteners extending through the fastener openings and secured into the end cap.

8. The accumulator of claim 1, wherein the lip at least partially blocks the segmented ring from moving in the second direction.

9. The accumulator of claim 1, wherein segmented ring comprises a quadrilateral cross-section, and the ring recess comprises at least a partial quadrilateral cross-section recess.

10. The accumulator of claim 1, comprising a movable piston located in the interior space and dividing the interior space in to a first hydraulic fluid chamber and a second inert gas chamber.

11. The accumulator of claim 1, wherein the end cap comprises a fill port providing fluid communication between an exterior of the end cap and at least a portion of the interior space.

12. A hydraulic accumulator, comprising:

a body having at least one opening, an interior space, and an interior wall, the interior wall comprising a first wall portion, a second wall portion, a stop wall between the first wall portion and the second wall portion, and a ring recess located long the second wall portion adjacent the opening, the stop wall extending transverse to the first wall portion and the second wall portion;

a removable end cap sized to close the opening when in a closed position, the stop wall blocking the end cap from moving in a first direction away from the opening;

a segmented locking ring removably positioned within the ring recess adjacent the end cap opposite the interior space to stop the end cap from moving in a second direction away from the interior space; and, a holding ring removably connected to the end cap and positioned to hold the locking ring in the ring recess when connected to the end cap, the holding ring comprises a first ring portion, a lip, and an open interior, the open interior configured to permit access to the end cap, the lip extends radially from the first ring portion opposite of the open interior, the lip covers an exterior face of the segmented locking ring opposite the end cap to create a seal between the holding ring and the second wall portion of the body when the holding ring is connected to the end cap.

13. The accumulator of claim 12, wherein the end cap comprises a peripheral step wall; stop wall engages the peripheral step wall and prevents the end cap from moving in the first direction.

14. The accumulator of claim 12, wherein the end cap comprises a circumferential wall comprising a first portion, a second portion, and a step portion, the step portion extending transverse to the first portion and the second portion, the step portion positioned to contact the stop wall to stop the end cap from moving in the first direction toward the interior space.

15. The accumulator of claim 14, wherein the first portion of the circumferential wall is in contact with the first wall portion of the body and the second portion of the circumferential wall is in contact with at least a portion of the second wall portion of the body and the step wall is in contact with the stop wall when the end cap is in the closed position.

16. The accumulator of claim 12, wherein the lip at least partially blocks the locking ring from moving in the second direction away from the interior space;

the first ring portion of the holding ring comprises an outside annular surface that engages and covers an interior annular surface of the locking ring, the lip extends radially beyond the outside annular surface;

the first ring portion and the lip of the holding ring form an L-shape cross-section;

a rear surface of the first ring portion provides a sealed engagement with the end cap when the holding ring is connected to the end cap;

an outside annular surface of the lip comprises a seal recess configured to receive a seal element; and, the rear surface of the first ring portion comprises a seal recess configured to receive a seal element.

17. The accumulator of claim 12, wherein the locking ring comprises a rectangle cross-section, and the ring recess comprises at least a partial rectangle cross-section recess.

18. The accumulator of claim 12, comprising a movable piston located in the interior space and dividing the interior space in to a first hydraulic fluid chamber and a second inert gas chamber.

19. The accumulator of claim 12, wherein the end cap comprises a fill port providing fluid communication between an exterior of the end cap and at least a portion of the interior space.

20. A method of closing a hydraulic accumulator, comprising the steps of:

sliding an end cap into an opening of the accumulator until the end cap is prevented from further inward movement in a first direction by a stop element of the accumulator;

placing each of the segments of a plurality of segments of a segmented ring in a ring recess of the accumulator adjacent a front surface of the end cap to prevent the end cap from moving outward in a second direction; and, releasably attaching a pilot ring to the front surface of the end cap to hold the segmented ring in the ring recess and covering an exterior face of the segmented ring opposite the end cap with a lip of the pilot ring to create a seal between the pilot ring and an interior wall of the accumulator, the lip opposite of an open interior space of the pilot ring.

* * * * *